May 18, 1965  H. L. KAHLER ETAL  3,184,407
BOILER COMPOSITION AND METHOD
Filed Feb. 16, 1962  3 Sheets-Sheet 1

INVENTORS
Harry Lewis Kahler
James Kenneth Brown
BY
ATTORNEYS

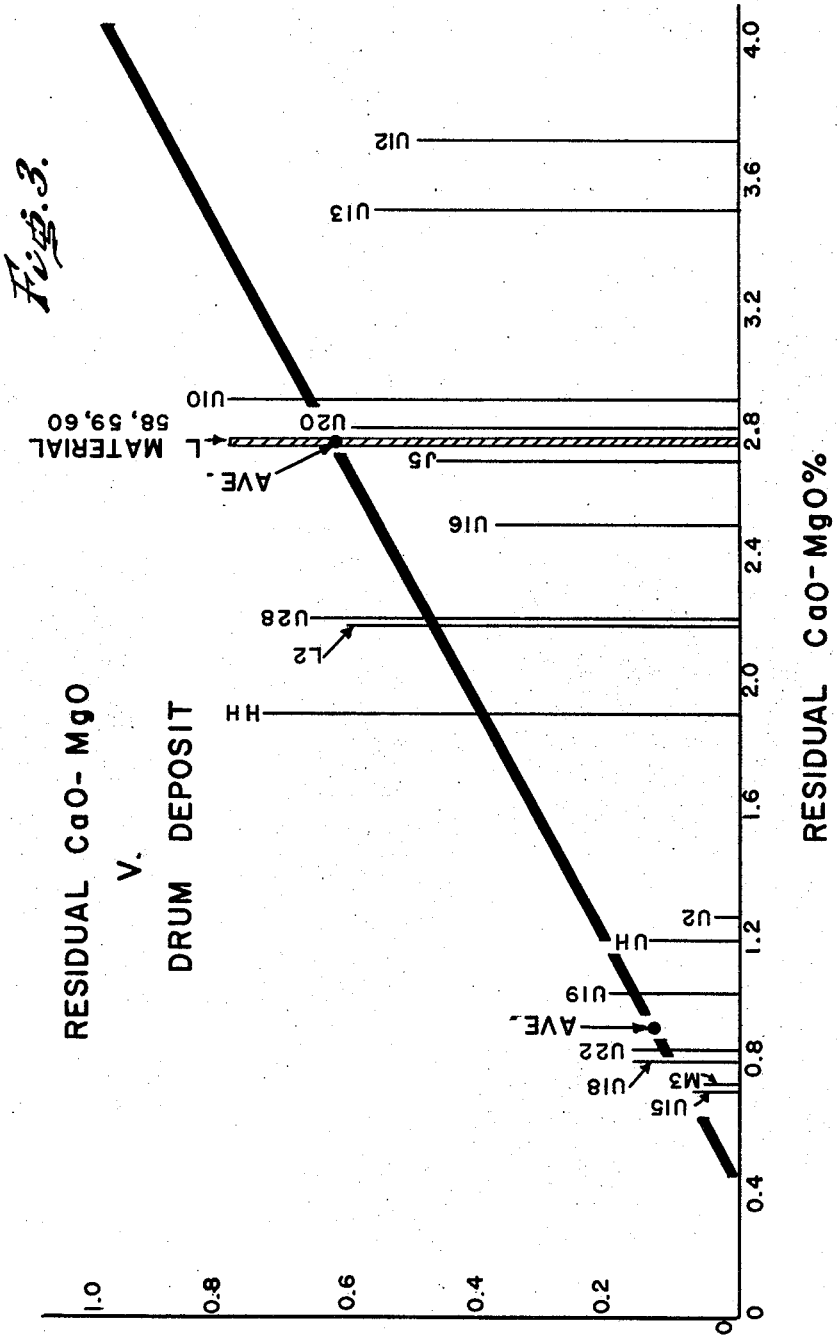

United States Patent Office 3,184,407
Patented May 18, 1965

3,184,407
BOILER COMPOSITION AND METHOD
Harry Lewis Kahler, Feasterville, and James Kenneth Brown, Huntingdon Valley, Pa., assignors to Betz Laboratories, Inc., Philadelphia, Pa., a corporation of Pennsylvania
Filed Feb. 16, 1962, Ser. No. 173,671
9 Claims. (Cl. 210—58)

The present invention relates to methods for treating tannery waste liquors and to tannery waste products suitable for boiler treatment.

A purpose of the invention is to avoid the formation of boiler feedline drum deposits by feeding tannery waste liquors.

A further purpose is to reduce the difficulty with boiler water feed insolubles from tannery waste products.

A further purpose is to enhance the boiler water dispersive powers of tannery waste liquors.

A further purpose is to remove calcium oxide compounds and magnesium oxide compounds from tannery waste liquors by reacting with precipitating agents or by ion exchange or by both procedures.

A further purpose is to remove calcium oxide and magnesium oxide materials from tannery waste liquors by reacting with alkaline materials such as sodium hydroxide, and preferably also with a water soluble orthophosphate or polyphosphate and preferably also with a water soluble silicate. Instead of the water soluble hydroxides, other suitable alkaline materials may be used such as water soluble oxides or carbonates.

A further purpose is to lower the combined content of calcium oxide and magnesium oxide by weight on a dry basis in the tannery waste material to below 1% and preferably below 0.6%.

A further purpose is to lower the content of calcium oxide in the tannery waste product to below 0.6% and to lower the level of magnesium oxide to below 0.2% and preferably below 0.05%, all on a dry basis by weight.

A further purpose is to conduct the removal of the calcium oxide and magnesium oxide compounds at a suitable concentration of the order of 17% total solids by cooking the tannery waste liquor preferably with 4% of sodium hydroxide, 0.7% of sodium pyrophosphate and 2% of sodium metasilicate.

Further purposes appear in the specification and in the claims.

The drawings are intended to illustrate the test apparatus and to show certain results.

FIGURE 3 is a curve plotting drum deposits of the tannery waste liquor in grams against residual calcium oxide and magnesium oxide combined, in percent by weight on a dry basis.

Figure 1:
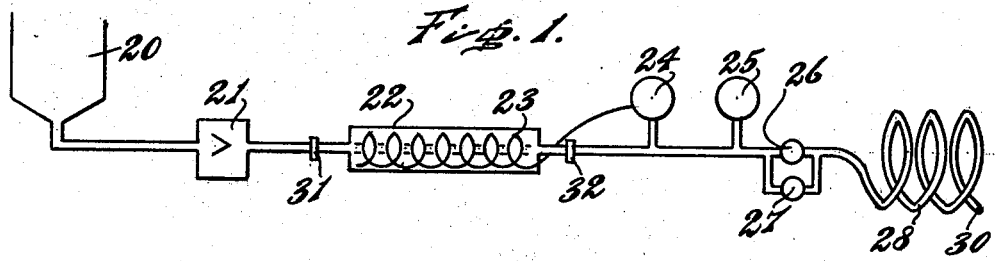
FIGURE 1 is a diagram showing a test mechanism used in connection with the invention.

Describing in illustration but not in limitation and referring to the drawings:

For several years past, spent or waste tanning liquor from the tanning of leather has been used as a steam boiler dispersive. This material is a combination of tannins together with materials including chemicals picked up in the tanning process from the hides and skins, including chemicals used in unhairing and other operations. The liquor resulting from the vegetable tanning of leather is preferred, such as that coming from the tanning of sole leather, but liquor from tanning of skins for upper shoe leather, as well as liquor from tanning of leather for belts, gloves, and other products are usable providing precautions are taken to avoid excessive chromic ion resulting from use of the chromic tanning process in conjunction with vegetable tanning. After the tanning process is finished this liquor is collected, cooked with sodium hydroxide and sodium sulphite in open vats for a period of time with live steam to solubilize as much of the materials as possible.

After this cooking operation, as much of the insoluble materials as possible are removed by settling out of the products and the remainder of the tannery waste liquor is spray dried to a dry free flowing powder. This material is referred to elsewhere herein as material L. The composition of material L varies somewhat between batches; a typical analysis is 58 to 65% organic material, 2% calcium oxide, 1% magnesium oxide, 10% $SO_3$, 8% sodium ion, 6% hydroxyl ion, 0.3% silica, and 6 to 14% of water. This product results from using vegetable tanning materials of a formula well known in the art including quebracho, chestnut, wattle, myrabolan, valonia and mangrove, for example.

In the course of using material L, it has been the practice to add various other materials such as soda ash, phosphates of various types, silicates, sulfites and other chemicals well known in the boiler art. These mixtures have been fed to the boiler from solution tanks by pumps direct to the boiler steam drum. Although this organic material has been found to aid in dispersing boiler sludges and lessening boiler deposits, it has two major difficulties attendant upon its use. The first difficulty is the tendency to form a deposit in the feed line inside the steam drum of the boiler. This deposit reduces the feed of treatment, and in severe cases eventually completely blocks off the feed line. This deposit has been encountered in many plants, and we find that its approximate composition averages 60 to 80% by weight calcium and magnesium phosphates, 10% organic material, some silica and water.

The second disadvantage of material L when used in conjunction with other boiler chemicals is that it produced insolubles in feed tanks and lines external to the boiler. Usual practices is to mix the material with water to form a 5% solution by weight, although the concentration of the solution can be varied if required. The accumulation of sediment in the tanks and line requires increased labor to keep them clean. This sediment in the chemical feed tank and in the chemical lines external to the boiler does not create as dangerous a problem as deposits in the feed lines inside the boiler drum but external sediment is very undesirable and unsatisfactory from the user standpoint.

Because material L is inexpensive and provides good properties inside the boiler, a study was undertaken in an effort to eliminate the difficulties above described. At the outset it was apparent that organic material L was the basic cause of the deposits and insolubles, since these difficulties did not arise when feeding other organic materials under similar conditions. In many installations the difficulties through deposits and insolubles became so severe that it was necessary to give up using organic material L, and it was necessary to employ other less desirable organic materials.

The research in the laboratory on organic material L was directed particularly to the following:

(1) Elimination of the dangerous deposit formation in the chemical feed lines inside the steam drum.

(2) Elimination of the insolubles in the feed tank and chemical lines external to the boiler.

(3) Obtaining the objectives of paragraphs 1 and 2 above without loss of boiler dispersive power and actually attempting to increase the boiler dispersive power.

FEED LINE DEPOSITS STUDY INSIDE THE STEAM DRUM

In order to test deposit formation, a tester was built as shown in FIGURE 1. In the tester a feed tank 20 is connected to the input of a metering pump 21 which discharges to the central passage of a heater 22 which has an electric resistance heater coil 23 which is connected to a suitable electric circuit and controlled by a thermostatic switch 24 which senses the temperature of the liquid on the output side of the heater. The system beyond the thermostatic switch 24 has a pressure gage 25, an automatic relief valve 26 and, in parallel with it hydraulically, a manual relief valve 27 beyond which the liquid passes through cooling coils 28 to waste 30.

In the actual experiment the heater was a 30 inch length of ½ inch steel pipe wrapped with insulated resistance wire which furnished heat to simulate feed pipe heat transfer inside the steam drum of a boiler. The heater was removable from the system at unions 31 and 32 to permit cleaning and inspection of the deposit formed. The test employed a maximum heater temperature of 350° Fahrenheit and a pressure of 250 p.s.i. In the particular experimental apparatus feed tank 20 held 8 liters of a 5% by weight treatment solution, and the treatment solution was pumped through the heater at a rate of 0.7 gallons per hour for a 3 hour period. The rest of the equipment functioned to control the operation. After the 3 hour test, the heater was detached and cleaned by brushing to remove the deposit which was then examined and evaluated.

The conditions of the test device of FIGURE 1 closely simulated plant conditions, and were found to give deposits of about the same composition as those obtained in the plant, indicating that the conditions of the plant problem had been captured in the laboratory. Table 1 shows results of tests carried out in this tester. In Table 1, "L" refers to the percentage of the total treatment by weight which is material L, "Tripoly" refers to the percentage of the total treatment by weight which is sodium tripolyphosphate, "Hexameta" refers to the percentage of the total treatment by weight which is sodium hexametaphosphate, "DSP" refers to the percentage of the total treatment by weight which is disodium phosphate, "Ash" refers to the percentage of the total treatment by weight which is soda ash, "Lig. sol." refers to the percentage of the total treatment by weight which is sulphonated lignin solution, "Sod. Meta" refers to the percentage of the total treatment by weight which is sodium metasilicate, and $SO_3$ refers to the percentage of the total treatment by weight which is sodium sulphite.

In Experiment 1 where 79% of material L and 21% of sodium tripolyphosphate were used, a deposit of 0.74 gram was obtained. This corresponds to the type of deposit obtained in the plant. Experiments 2 and 4 show the use of sulphonated lignin instead of material L, in which case very little deposit was obtained. The deposit was reduced 84%. Actually any treatment which gave a deposit in this test of 0.1 gram or less was found not to give trouble in the plant and any treatment which gave a deposit in this test of around 0.5 gram or more was found to give serious trouble in the plant.

Experiments 8 and 10 show that the use of different phosphates, in this case disodium phosphate and sodium hexameta phosphate instead of sodium tripolyphosphate was of no value in diminishing the deposit formed as compared with the deposit of Experiments 1 and 11. Experiments 5, 6 and 7 show the effect of using well known inorganic materials, respectively soda ash with sodium metasilicate in some cases and with $SO_3$ in some cases. They indicate that the deposit increased slightly over the deposit formed with phosphate and organic material L alone.

As shown in Experiment 9, when phosphate was replaced by other inorganic materials used in the art, in this case soda ash, sodium metasilicate and $SO_3$, the problem of deposit was greatly intensified. The heater tube of the tester was in this case almost all completely blocked. The composition of the deposit in this instance was found to be insoluble carbonates and silicates of calcium and magnesium. It is rare that organic material is used without the other necessary inorganic ingredients such as phosphates, soda ash, carbonates, and sulfites, etc.

Experiment 12 was run to show the deposit obtained from organic material L alone. This deposit is very low, and supports the view that it is not the use of organic material L alone which causes the deposit but the use of inorganic materials along with material L. This also makes clear the fact that although phosphate causes a serious problem of its own, it also when used with organic material L eliminates a more serious problem which results otherwise from calcium carbonate and magnesium silicate.

Based upon this research and other similar researches the following conclusions seem to be indicated:

(1) When organic material L alone is used it gives no substantial drum deposit.

(2) Sulphonated lignin when used alone also gives no appreciable drum deposit. This supports the conclusion that organic material L creates the problem when it is used with phosphate and other inorganic materials.

(3) When organic material L is used without phosphate but with soda ash, silicate and sulfite it gives a high drum deposit.

(4) When organic material L is used with phosphate, silicate and sulfite, this reduces the total deposit but allows a substantial deposit to remain of a different composition, that is, phosphate.

(5) When organic material L is used with phosphate with or without soda ash and with or without silicate the problem encountered in the test is similar to that encountered in the plant.

The majority of these results were obtained from material secured from one tannery. However, the results were checked on the same material obtained from another tannery, and substantially the same results were secured. In most cases the composition of material L varied somewhat from tannery to tannery but was generally consistent enough to permit obtaining end products of acceptable quality. Where variations in the composition of material L existed, it was found that they could be taken care of properly by selecting suitable chemicals for cooking and combining them in proper ratios.

INSOLUBLES IN FEED SOLUTION

The insolubles in organic material L are of two types. There are insolubles present in the material L itself. These vary with different shipments but over the past years have in some cases been as low as 1% and in other cases as high as 20% based upon the insolubles test. In this test a 5% by weight solution of the material is heated to 150° F. and the insolubles which settle out are read in cubic centimeters per 100 cc. in a calibrated tester after 24 hours. Experience indicates that insolubles of this character as high as 0.5 cc. based on this test are permissible. Above this point the insolubles result in dirty feed tanks and clogging of the feed line external to the boiler. The usual material obtained on the market is sufficiently free from natural insolubles to pass this insolubles test, although some shipments have caused difficulty due to insolubles.

The second and more important type of insolubles is those which are produced when material L is fed with phosphates and other boiler water inorganic materials. The feed solution usually of a concentration of about 5% interacts chemically causing additional insolubles above those naturally occurring as mentioned above. These second insolubles are measured by the same test procedure. They vary from shipment to shipment, and have been as low as 0.05 cc. per 100 cc. and as high as 3 cc. per 100 cc. These two types of insolubles together account for the plant feed insolubles problem referred to above.

ELIMINATION OF DRUM DEPOSIT AND INSOLUBLES IN FEED SOLUTION

Since both the drum deposit and the feed tank insolubles are made worse by phosphate and other boiler inorganic additives, efforts were made to remove from the tanning waste those materials which formed insoluble phases. Various chemicals are used in tanning, and calcium and magnesium particularly are introduced by lime used in unhairing operations. Efforts were made to determine the presence of various chemicals in the tannery waste. The crude concentrated tannery waste was treated at a level of organic concentration approaching that used by the tannery in the manufacture of material L. The treating period extended up to 24 hours. By these experiments we discovered that the tannery waste after being treated with materials which precipitated magnesium and/or calcium and magnesium as insoluble phases and after removal of the precipitate gave organic materials which produced little or no drum deposit, and had very little insolubles whether used alone or with phosphates and other chemicals. These experiments also indicated that where the organic material did not have magnesium eliminated particularly, or calcium and magnesium eliminated, high drum deposits were obtained.

The results under discussion are referred to in Table 2, where "Org." refers to the organic material which was in some cases material L and in other cases material L with a lowered content of CaO and MgO, "TSP" refers to trisodium phosphate, "Sod. Pyro" refers to sodium pyrophosphate, "Sod. Meta" refers to sodium metasilicate, "Tripoly" refers to sodium tripolyphosphate, and "ash" refers to soda ash, each in weight percent of the treatment composition, the balance being water.

Figure 2:
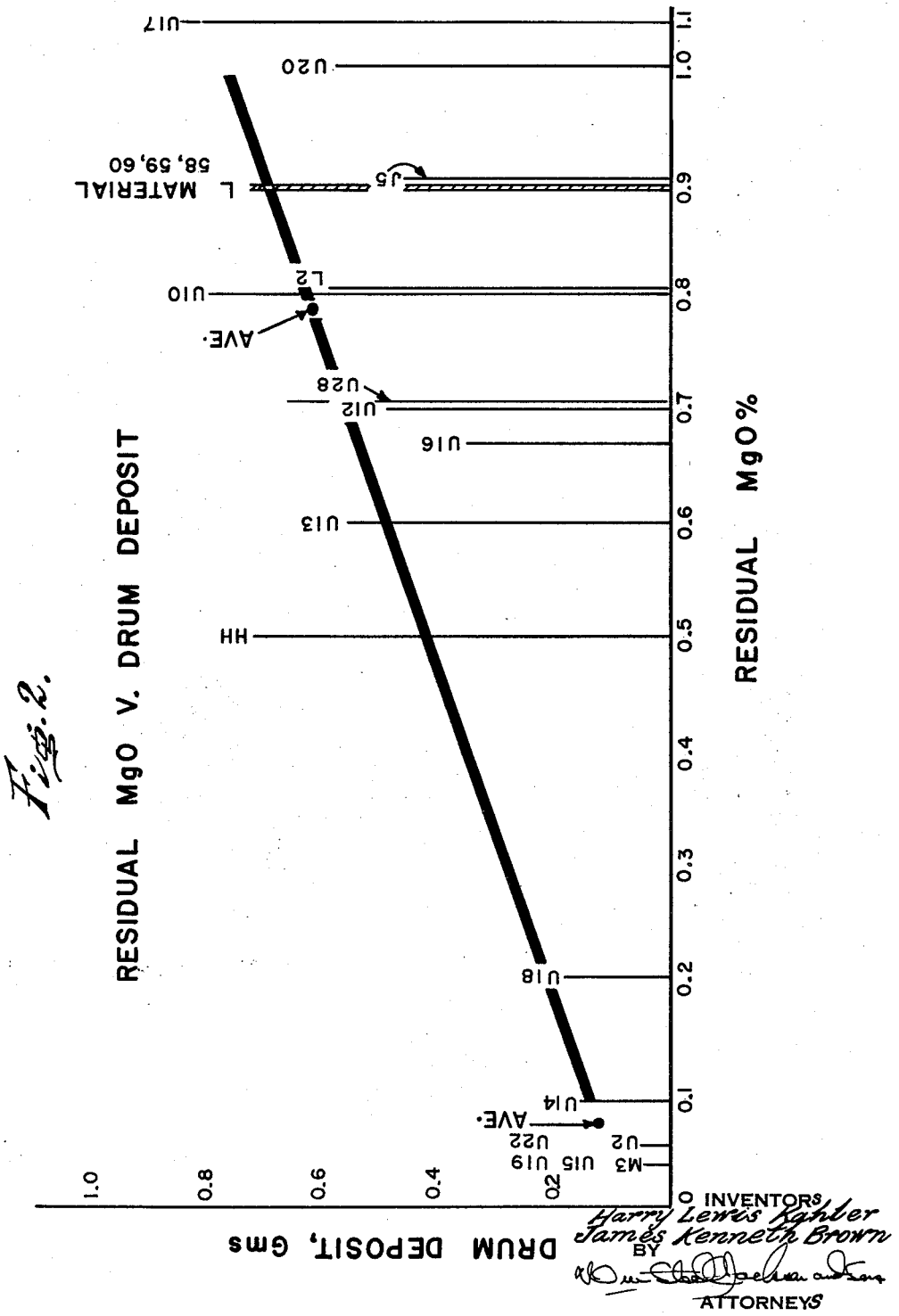
FIGURE 2 is a curve plotting drum deposits from the tannery waste liquor in grams against residual magnesium oxide in percent by weight on a dry basis.

FIGURE 2 shows drum deposit in grams plotted against residual magnesium oxide in percent by weight, and FIGURE 3 shows drum deposit in grams plotted against residual lime plus magnesium oxide in percent by weight.

In Table 2 Experiment 8, the results are for the average of 15 shipments of material L in 1958, 1959 and 1960, and indicate that an average drum deposit of 0.74 gram was obtained with insolubles of 1.6 cc. per 100 cc.

The calcium oxide and magnesium oxide contents of the dried materials in these shipments were 1.9% and 0.9% by weight respectively. Thus the levels of calcium oxide and magnesium oxide were both high enough to give undesirably high drum deposits and feed insolubles.

Experiments 1 to 7 inclusive show organics resulting from using various chemicals to remove or reduce the magnesium oxide and/or the calcium and magnesium oxide contents of the final product. It will be noted that sodium hydroxide was used with sodium sulfite and trisodium phosphate, sodium hydroxide was used with sodium metasilicate and with sodium tripolyphosphate, sodium hydroxide was used with sodium pyrophosphate and sodium metasilicate, sodium hydroxide was used with trisodium phosphate and sodium metasilicate, and sodium pyrophosphate was used with sodium metasilicate. The results were as follows:

Very low drum deposits
Very low feed insolubles

Thus in Experiment 1, sodium hydroxide, sodium sulfite and trisodium phosphate gave excellent results, as did combinations of sodium hydroxide, sodium tripolyphosphate and sodium metasilicate (Experiment 2), and of sodium hydroxide, sodium pyrophosphate and sodium metasilicate (Experiment 3). In all cases the magnesium oxide content was reduced from its former level of 0.9% to a maximum of 0.2% and to a minimum of 0.03%. The calcium oxide was lowered from its level of 1.9% to below 1.2% and in one case as low as 0.05% (Experiment 19).

These results by no means represent all of those made, as many tests were performed in which the insolubles still remained unsatisfactory.

It appears from the results in Table 2 that all treatments which lowered the calcium and magnesium oxide to a low level gave little or no drum deposit and gave very low feed insolubles. We have discovered therefore that the proper way to treat this tannery waste is in a highly alkaline solution with chemicals which markedly reduce calcium and magnesium and particularly magnesium. It is not sufficient to treat with chemicals simply at random. For example, sodium hydroxide alone in Experiment 9 did not remove calcium to any considerable extent and hardly affected the content of magnesium. This is reflected in the high drum deposit of 0.6 gram.

It should be noted that although sodium hydroxide is generally regarded as a good agent to precipitate magnesium as insoluble magnesium hydroxide, this does not happen in tannery waste. The organic materials in tannery waste are sufficiently powerful to prevent the precipitation of this insoluble phase. The organic materials in the tannery waste are however not powerful enough to prevent phosphates and silicates from precipitating the magnesium as an insoluble and removable phase.

Experiments 10 and 11 made with different tannery wastes treated with both sodium hydroxide and sodium sulfite, similar to the prior art manufactured product L, again showed incomplete removal of calcium and magnesium resulting in high drum deposits of 0.66 and 0.73 gram.

Experiments 12 to 18 inclusive show that even where sodium hydroxide is used with a water soluble phosphate and preferably with a water soluble silicate, successful removal of calcium and magnesium depends on having sufficient chemicals present to react with the calcium and magnesium. All of the experiments where the calcium and magnesium levels were high gave high drum deposits.

Experiment 19 shows that lowered temperatures can secure satisfactory results. Experiment 20 shows that soda ash can be used as an alkali instead of sodium hydroxide with sodium pyrophosphate and sodium silicate to give satisfactory results.

Experiment 21 using sodium hydroxide and sodium fluoride showed that both calcium and magnesium content could be satisfactorily lowered.

Although the calcium and magnesium salts of metaborate and oxalate are relatively insoluble, Experiments 22 and 23 show that the calcium and magnesium contents were not lowered in these experiments. Apparently the organic material helped disperse these salts as was the case of magnesium hydroxide when precipitated by sodium hydroxide alone.

Additional experiments not reported in the tables were made using various higher concentrations of sodium hydroxide, sodium phosphates and sodium silicate and they gave further removal of calcium and magnesium, with very low drum deposits and low feed insolubles, although they were economically unfeasible not only because they wasted chemicals but they distorted the resulting ratio of organic to inorganic material in the final product away from a desirable balance in the region of 60 to 40. The only gain made by increasing the proportion of inorganic materials in the treatment over that necessary was to increase the rate of solution of the organic materials in the preparation of the feed solution and reduce somewhat the feed insolubles of a typical treatment, but the gain was obtained at the expense of grossly excessive chemical cost.

FIGURES 2 and 3 show the results of Table 2. It is evident from these figures that drum deposit is a function of residual magnesium oxide, and also is a function of calcium oxide plus magnesium oxide, in the finished product. FIGURE 2 indicates that if the magnesium oxide is reduced by the treatment to below 0.2% and preferably below 0.05% the drum deposit is reduced to such a level that it is no longer a problem in the plant. On the other hand, if the magnesium oxide is not removed, or if its reduction is so poor that the residual magnesium oxide content is above 0.4% the drum deposits are high and result in serious problems in the plant. The large dark line joins the averages of the low magnesium oxide group at 0.07%, and the high magnesium oxide group at 0.78%. The broken line represents the magnesium oxide contents from shipments of material L in 1958, 1959, and 1960 along with the drum deposits which they gave.

FIGURE 3 relates the residual total of calcium oxide plus magnesium oxide to the drum deposits and shows essentially the same story as with magnesium oxide alone. The residuals must be low in order to secure freedom from drum deposits. If the total of calcium oxide plus magnesium oxide residuals are higher than 2%, a serious problem of drum deposits in the plant exists. If the residuals of calcium oxide and magnesium oxide are lower than 1% and preferably lower than 0.6%, providing there is a reasonable distribution of calcium oxide and magnesium oxide removed, then there is no problem with drum deposits.

Table 2 also shows that the good treatments gave greatly reduced feed insolubles. All treatments except Experiment 7 gave lower feed insolubles than the present material L as shown in Experiment 8. Even the treatments in Experiments 9 to 18 gave low insolubles.

If it is desired, the calcium oxide and magnesium oxide can be lowered or eliminated by ion exchange prior to concentrating. One procedure for doing this is to pass the tannery tailings as they leave the last tanning vat through an ion exchanger. Any suitable ion exchange resin which will for example substitute hydrogen ions or sodium ions for calcium ions and magnesium ions is suitable. For example, a cation exchange resin of the cross-linked polystyrene base sulphonic acid type (Rohm and Haas Amberlite I R–120) was able to lower in both the sodium ion cycle and the hydrogen ion cycle the lime and magnesium by 99.5 to 99.8%. This particular tailing had 4.2% solids, although it will be evident that the percentage of solids will vary according to the number of hides processed, etc. This high percentage removal of lime and magnesium will permit tailings to fall into a favorable composition which will not cause drum deposit.

However satisfactory the removal of lime and magnesium by the ion exchanger, it will be noted that the effluent from the ion exchanger must still be concentrated and chemically treated in order to obtain the other remaining objectives, that is, to produce a good feeding solution and to obtain increased boiler dispersive power. It will therefore be evident that ion exchange may not in every case be fully competitive to hot chemical treatment which attains the three objectives in one operation.

BOILER DISPERSIVE POWER

Figure 4:
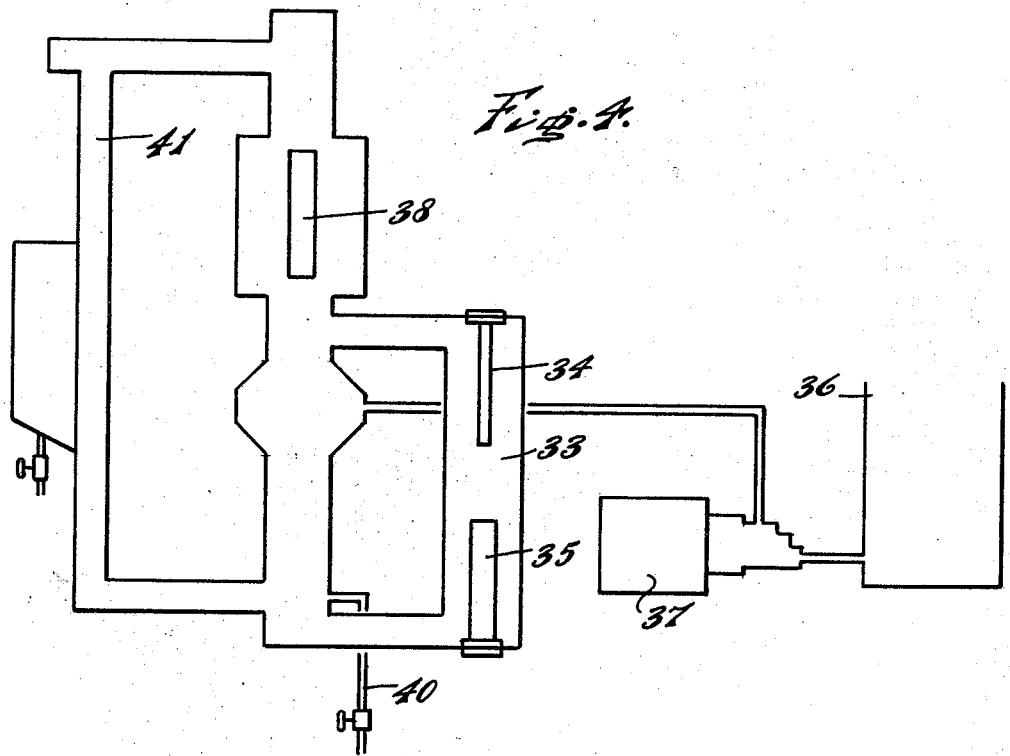
FIGURE 4 is a diagram showing a test boiler used in certain experiments described in the specification.

An effort was made also to determine what effect the chemicals in the treatment exerted on the dispersive power of the material in respect to boiler deposit formation. Although it was a primary objective to eliminate drum deposit and a secondary objective to eliminate feed water insolubles, this should not be accomplished with loss of boiler dispersive power. It is very important if possible to increase the boiler dispersive power while accomplishing also the primary and secondary objectives, and this was found possible. The testing for boiler dispersive power was carried out in an experimental boiler which is shown in FIGURE 4. This laboratory test boiler has been in use for 17 years and its test results have proven to simulate accurately plant operation. The boiler 33 has a high transfer heater 34 (Hi T) and a low transfer heater 35 (Lo T). Feed and treatment water from a tank 36 passes through feed pump 37 to the boiler. Blowdown is accomplished through blowdown line 40. The high transfer heater 34 uses 180,000 B.t.u. per square foot per hour, and the low transfer heater 35 uses 28,000 B.t.u. per square foot per hour. These heaters supply the heat to run the boiler at 300 p.s.i. and 420° F., and they also provide the heat transfer surface on which the boiler dispersive power is evaluated. The boiler has a steam leg 41.

The boiler operates on a synthetic feed water by which boiler encrustants and organic treatments are introduced into the boiler as needed. A continuous blowdown system operates the boiler at 15 cycles of concentration. The sight glass 38 above the water line is used for the detection of foaming of the boiler water. A continuous recording sodium spectrophotometer was used on each experiment to record any steam contamination above normal. Each experiment was run 2 days after which the electrical heaters 34 and 35 were withdrawn, and the deposits thereon were examined critically.

Table 3 shows the results obtained from many different chemical treatments for the boiler. The abbreviations are as before, and "EDTA" means ethylene diamine tetra acetic acid, and "HM" means sodium hexametaphosphate. Experiment 1 lists an average of 14 shipments of material L and shows that its boiler dispersive power is acceptable on both the low transfer heater for scaling and on the high transfer heater for scaling. Plant boiler dispersive results with this material have been satisfactory over the past few years, but as noted above the drum deposits and the feed conditions have been bad. The compositions of Experiments 2, 3, 4, 5, 7, 8 and 9 show that the boiler dispersive power can still further be improved in accordance with the present invention. These results show a 42% reduction in deposit on the low transfer heater and a 33% reduction in deposit on the high transfer heater compared to the present material L. Actually if one of the best treatments is selected, for example Experiment No. 4, the reduction in the low transfer deposit is 68% and the reduction in the high transfer deposit is 55%.

The other treatments in Table 3 show that the correct chemicals must be selected as otherwise boiler dispersive power is lost. Thus Experiments 6, 12, 14, 15, 16, 17 and 18 would not be satisfactory for boiler use.

Experiment 6 shows poor results in boiler dispersive power and also poor results in feed insolubles. Experiments 10 and 11 show good results in boiler dispersive power but high feed insolubles. Experiment 13 shows mediocre results in boiler dispersive power and high feed insolubles.

Experiment 6 shows that chemicals for precipitating calcium and magnesium such as water soluble silicate and water soluble phosphate need help as they are not alone sufficient to produce good boiler dispersive power. Comparison to Experiment 7 which employs sodium hydroxide in addition to water soluble phosphate and water soluble silicate shows that alkalinity is important in giving a good all-around treatment. Experiment 19 shows that alkalinity alone can produce an acceptable boiler dispersive but fails to avoid high feed insolubles.

Experiment 10 shows that sodium citrate on top of sodium hydroxide and sodium pyrophosphate give good boiler dispersive power but bad feed insolubles. Comparing this to Experiment 8 it is evident that sodium hydroxide plus sodium pyrophosphate give both good boiler dispersive power and good feed solutions.

Summarizing these results it is apparent that by cooking tannery waste liquors with chemicals, organic compositions are produced which furnish good feeds but lack either boiler dispersive power or else form drum deposits or both. Other chemicals produce organic compositions which do not form drum deposits but fail to give proper feeds or fail to give proper boiler dispersive power or both. By using the correct chemicals in the correct concentration levels under the proper cooking conditions this crude tanning material can be made to give the following objectives:

(1) No drum deposits.
(2) Good feeding solutions.
(3) Increased boiler dispersive power.

The first chemical which is important to use is a chemical which introduces alkalinity. Suitable chemicals for this purpose are sodium hydroxide, sodium oxide, sodium carbonate, potassium hydroxide, potassium oxide, potassium carbonate or equivalent alkalinity. The concentration should be 4% sodium hydroxide or its equivalent for 17% organic in the concentrated tannery waste. It should provide a final pH of at least 9.5, preferably higher than pH 10.5, and most desirably between pH 10.5–12.0. When the level of the organic in the tailings is varied on concentration for reasons of cost or conditions beyond our control, the alkalinity should be adjusted accordingly to secure the proper alkaline environment.

In addition it is necessary to use a precipitating agent or agents for calcium and magnesium. Any one of the phosphates is suitable, either orthophosphate or molecularly dehydrated phosphate. Suitable examples are trisodium phosphate, tripotassium phosphate, disodium phosphate, dipotassium phosphate, monosodium phosphate, monopotassium phosphate, phosphoric acid, sodium hexametaphosphate, sodium tetraphosphate, sodium acid pyrophosphate, sodium tripolyphosphate, tetrasodium pyrophosphate and tetrapotassium pyrophosphate or their acids. Where the acids are used, additional alkalinity should be employed. These are all water soluble phosphates. The concentration of the phosphate should be of the order of 0.5 to 10% by weight in terms of sodium pyrophosphate anhydrous for conditions set forth above.

Water soluble silicates may also be used and preferably in addition to the water soluble phosphates although they may be used alone to precipitate calcium and magnesium. Suitable water soluble silicates are sodium metasilicate, potassium metasilicate, sodium orthosilicate, potassium orthosilicate and any of the other water soluble sodium and potassium silicates having differing ratios of $Na_2O$ to $SiO_2$. The concentration of water soluble silicate should be of the order of 0.5 to 10% by weight in terms of $Na_2SiO_3$ anhydrous for the conditions set forth above.

Water soluble fluorides can also be used to reduce calcium and magnesium to the satisfactory level in the presence of sufficient alkalinity. Examples are sodium and potassium fluorides.

It is necessary to allow sufficient time for the alkalinity and the precipitating agent to act on the organic material, and to precipitate the magnesium and calcium. This time may vary between 7 and 24 hours under boiling conditions and longer times are required at lower temperatures. It is evident that cooking the tannery waste with the chemicals referred to alters the composition since the crude material at the same organic level gave boiler deposits on low and high transfer surfaces respectively of 3.4 and 3.7 grams. Thus in Table 3 it is evident that Experiment No. 4 showed a reduction in the deposit on low transfer of 96% and on high transfer of 93%.

In view of our invention and disclosure, variations and modifications to meet individual whim or particular need will doubtless become evident to others skilled in the art, to obtain all or part of the benefits of our invention without copying the process and composition shown, and we, therefore, claim all such insofar as they fall within the reasonable spirit and scope of our claims.

*Table 1*

FEEDLINE DRUM DEPOSIT

| Exp. No. | L | Material in total treatment, percent | | | | | | $SO_3$ | Grams deposit |
| --- | --- | --- | --- | --- | --- | --- | --- | --- | --- |
| | | Tri Poly | Hexa Meta | DSP | Ash | Lig. Sol. | Sod. Met. | | |
| 1 | 79 | 21 | | | | | | | [1] 0.74 |
| 2 | | 21 | | | | 79 | | | 0.11 |
| 3 | | | | | | 100 | | | 0.13 |
| 4 | | | 18 | | 3 | 79 | | | 0.08 |
| 5 | 59 | | 18 | | 3 | 10 | | 10 | 0.98 |
| 6 | 59 | | 18 | | 3 | 10 | 10 | | 1.01 |
| 7 | 49 | | 18 | | 3 | 10 | 10 | 10 | 1.05 |
| 8 | 79 | | | 21 | | | | | 0.85 |
| 9 | 69 | | | | | 10 | | 10 10 | 6.6 |
| 10 | 79 | | 21 | | | | | | [2] 0.88 |
| 11 | 79 | 21 | | | | | | | [3] 0.73 |
| 12 | 100 | | | | | | | | [4] 0.12 |

[1] Average of 14 experiments of 4 different shipments.
[2] Average of 3 different shipments.
[3] Made from second supplier of tannery waste.
[4] Average of 2 experiments.

Conditions: 5— solution of the treatment. 3 hrs. at 250 p.s.i., 350° F.

Table 2
RESIDUAL Ca AND Mg IN ORGANIC AS A RESULT OF THE TREATMENT

| Exp. No. | Treatment composition, weight percent | | | | | | | Feedline drum deposit, gms. | Insol. in 5% feeds | Percent dry | | | | Final pH of solution |
|---|---|---|---|---|---|---|---|---|---|---|---|---|---|---|
| | Org. | NaOH | Na₂SO₃ | TSP | Sod. Pyro | Sod. Met. | Others | | | Org. | Inorg. | CaO | MgO | |
| 1 | 8.5 | 1.9 | 1.27 | 2.2 | | | | 0.04 | ¹0.3 | 57 | 43 | 0.7 | 0.03 | 10.9 |
| 2 | 17.0 | 3.9 | | | | 1.95 | 0.65 tripoly | 0.13 | 0 | 59 | 41 | 1.1 | 0.09 | 10.2 |
| 3 | 17.0 | 3.9 | | | 0.65 | 1.95 | | 0.05 | 0.2 | 56 | 44 | 0.63 | 0.03 | 10.7 |
| 4 | 17.0 | 3.9 | | 0.65 | | 1.95 | | 0.04 | 0 | 62 | 38 | 1.2 | 0.05 | 10.7 |
| 5 | 17.0 | 3.9 | | | 0.65 | 1.95 | | 0.2 | 0 | 61 | 39 | 1.0 | 0.03 | 10.6 |
| 6 | 17.0 | 3.9 | | | | 1.95 | 0.65 tripoly | 0.18 | 0 | 57 | 43 | 0.8 | 0.04 | 10.2 |
| 7 | 17.0 | | | | 0.65 | 1.95 | | 0.15 | 2 | 68 | 32 | 0.6 | 0.2 | 9.1 |
| 8 | —15 shipments in 1958, 1959 and 1960 | | | | | | | 0.74 | 1.6 | 61 | 39 | 1.9 | 0.9 | 11.2 |
| 9 | 8.5 | 3.8 | | | | | | 0.6 | 0.1 | 61 | 39 | 1.4 | 0.8 | 11.5 |
| 10² | 17.0 | 3.9 | 2.6 | | | | | 0.66 | 0 | 62 | 38 | 1.5 | 0.7 | 10.6 |
| 11² | 17.0 | 3.9 | 2.6 | | | | | 0.73 | 0.25 | 58 | 42 | 1.4 | 0.5 | 11.7 |
| 12 | 17.0 | 0.65 | | | 0.65 | 1.95 | | 0.56 | 0 | 72 | 28 | 2.9 | 0.63 | 8.0 |
| 13 | 17.0 | 3.9 | | | 0.38 | 0.95 | | 0.37 | 0.2 | 60 | 40 | 1.8 | 0.67 | 11.5 |
| 14 | 17.0 | 3.9 | | 0.16 | | 0.5 | | 0.6 | 0 | 71 | 29 | 1.8 | 1.0 | 9.7 |
| 15 | 17.0 | 3.9 | | 0.16 | | 0.5 | | 0.8 | 0 | 63 | 37 | 2.1 | 0.8 | 10.6 |
| 16 | 17.0 | 0.65 | | | 0.65 | 1.95 | | 0.86 | 0.2 | 64 | 36 | 2.5 | 1.1 | 7.8 |
| 17 | 8.5 | 1.9 | | | | 1.9 | | 0.47 | 0.05 | 60 | 40 | 1.8 | 0.9 | 9.1 |
| 18 | 17.0 | 1.95 | | 0.38 | | 0.5 | | 0.5 | 0.2 | 70 | 30 | 3.1 | 0.72 | 9.2 |
| 19³ | 8.5 | 4.6 | | | 1.5 | 1.5 | | | 0.3 | 54 | 46 | 0.05 | 0.03 | 10.5 |
| 20 | 8.5 | | | | 0.31 | 0.95 | 4.7 ash | | 0.1 | 51 | 49 | 0.42 | 0.05 | 9.5 |
| 21 | 8.5 | 3.04 | | | | | 1 sodium fluoride. | | | 61.5 | 38.5 | 0.18 | 0.07 | 10.5 |
| 22 | 8.5 | 3.04 | | | | | 1 sodium oxalate. | | | 61.5 | 38.5 | 1.7 | 0.96 | 10.8 |
| 23 | 8.5 | 2.86 | | | | | 1 sodium metaborate. | | | 63.5 | 36.5 | 1.1 | 1.06 | 9.8 |

¹ 79 org., 20 tripolyphosphate, 1 anti-foam.  ² 2nd supplier of tannery waste.  ³ 1 day at 140° F.

Table 3
BOILER DISPERSIVE POWER OF VARIOUS TREATMENTS

| Exp. No. | Treatment composition, weight percent | | | | | | | Boiler deposit, gms./ft.² | | Feed Insol.,* cc. |
|---|---|---|---|---|---|---|---|---|---|---|
| | Org. | NaOH | Na₂SO₃ | TSP | Sod. Pyro. | Sod. Met. | Others | Lo T | Hi T | |
| 1 | Material L of 1958, 1959 and 1960 (14 shipments) | | | | | | | 0.41 | 0.58 | 1.6 |
| 2 | 8.5 | 1.9 | 1.27 | 2.2 | | | | 0.21 | 0.39 | 0.2 |
| 3 | 17.0 | 3.9 | | | | 1.95 | 0.65 tripoly | 0.14 | 0.23 | 0 |
| 4 | 17.0 | 3.9 | | | 0.65 | 1.95 | | 0.13 | 0.26 | 0.2 |
| 5 | 17.0 | 3.9 | | | 0.65 | 1.95 | | 0.38 | 0.62 | 0 |
| 6 | 8.5 | | | | 1.9 | 1.9 | | 1.0 | 1.6 | 2 |
| 7† | 17.0 | 3.9 | | | 1.9 | 1.9 | | 0.2 | 0.35 | 0.25 |
| 8 | 8.5 | 1.9 | | | 1.9 | | | 0.25 | 0.35 | 0.05 |
| 9 | 8.5 | 1.3 | | | 0.7 | | 1.3 Na₂O₂ | 0.37 | 0.55 | 0 |
| 10 | 8.5 | 1.9 | | | 0.9 | | 0.3 Sod. Cit. | 0.18 | 0.35 | 4 |
| 11 | 8.5 | 1.9 | 0.3 | | 0.9 | | 0.3 EDTA | 0.35 | 0.55 | 4 |
| 12 | 8.5 | | | 0.6 | | | 1.8 HM; 0.6 NaHSO₃. | 1.8 | 2.6 | 0.5 |
| 13 | 8.5 | 1.9 | | | | | 1.3 Na₂O₂ | 0.8 | 0.7 | 3.5 |
| 14 | 8.5 | | 1.3 | 1.3 | | | | 3.2 | 5.7 | 0 |
| 15 | 8.5 | | 1.3 | 1.3 | | | | 4.0 | 4.2 | 0 |
| 16 | 8.5 | | 3.3 | | | | | 3.8 | 4.2 | 0 |
| 17 | 8.5 | | 1.3 | | | 1.3 | .9 DSP | 1.6 | 2.4 | 0.05 |
| 18 | 8.5 | | 1.3 | | | 1.9 | | 1.6 | 2.9 | 0 |
| 19 | 8.5 | 3.8 | | | | | | 0.44 | 0.60 | 2 |
| 20 | 8.5 | | | | 0.31 | 1.0 | 4.7 ash | 0.35 | 0.38 | 0.1 |

*5% solution of 79% organic, 20% tripolyphosphate, 1% anti-foam.  †6 hour treatment.

Having thus described our invention what we claim as new and desire to be secured by Letters Patent is:

1. A method of reducing chemical feed line deposits and increasing boiler water dispersive power of tannery waste product fed to boilers, which comprises cooking a solution of tannery waste liquor with a water soluble alkali, a water soluble phosphate and a water soluble silicate all present in said solution in quantities sufficient to throw down magnesia as a precipitate and form a tannery waste product having a content of MgO on the weight of the solids in the tannery waste product below 0.2% by weight, removing the precipitate and feeding the tannery waste product free from the precipitate along with other boiler chemicals including phosphate in a chemical feed line direct into the steam drum of a boiler.

2. A method of claim 1, which comprises adding said reagents until the content of MgO on a dry basis is below 0.05% by weight.

3. A method of claim 1, which comprises reacting with sodium hydroxide as the water soluble alkali, with tetrasodium pyrophosphate as the water soluble phosphate, and with sodium silicate as the water soluble silicate.

4. A method of claim 3, in which the concentration of organic solids is 17%, the concentration of sodium hydroxide is 4%, the concentration of tetrasodium pyrophosphate is 0.7% and the sodium silicate is present as sodium metasilicate at a concentration of 2% in the tannery waste liquor as it is cooked.

5. A boiler treating composition, comprising in combination a tannery waste product produced from tannery waste liquor by the method of claim 1, and other boiler chemicals including phosphate.

6. A method of reducing chemical feed line deposits and increasing boiler water dispersing power of tannery waste product fed to boilers, which comprises cooking tannery waste liquid with a water soluble alkali and a water soluble fluoride in quantities sufficient to precipitate magnesia and form a tannery waste product having a content of magnesium oxide in the tannery waste product on the weight of the solids in the tannery waste product below 0.2% by weight, removing the precipitate, and feeding the tannery waste product free from the precipitate along with other boiler chemicals including phosphate through a chemical feed line to the steam drum of a boiler.

7. A boiler treating composition, comprising in combination a tannery waste product produced from tannery waste liquor by the method of claim 6, and other boiler chemicals including phosphate.

8. A method of reducing chemical feed line deposits and increasing boiler water dispersing power of tannery waste product fed to boilers, which comprises introducing an ion exchange material into the tannery waste liquor and removing magnesium oxide compounds from the tannery waste liquor by ion exchange and forming a tannery waste product having a content of magnesium oxide calculated on the weight of the solids in the tannery waste product of less than 0.2% by weight, separating the ion exchange material and the magnesium compounds associated therewith from the residual tannery waste product, and feeding the tannery waste product along with other boiler chemicals including phosphate in a chemical feed line direct into the steam drum of a boiler.

9. A boiler treating composition, comprising in combination a tannery waste product produced from tannery waste liquor by the method of claim 8, and other boiler chemicals including phosphate.

References Cited by the Examiner
UNITED STATES PATENTS 1,613,656  1/27  Hall _____ 210—53 X

FOREIGN PATENTS 972,433  8/50  France.

OTHER REFERENCES

Betz Handbook of Industrial Water Conditioning, Betz Laboratories, Inc., Philadelphia 24, Pa., Fifth Edition, 1957, pages 37–40, 46–50 and 90–112 particularly relied on.

Gurham: Principles of Industrial Waste Treatment, 1955, John Wiley and Sons, New York, page 70.

Rudolfs: Industrial Wastes, 1953, Reinhold Corporation, New York, pp. 148–153.

MORRIS O. WOLK, *Primary Examiner.*